Figure 4:
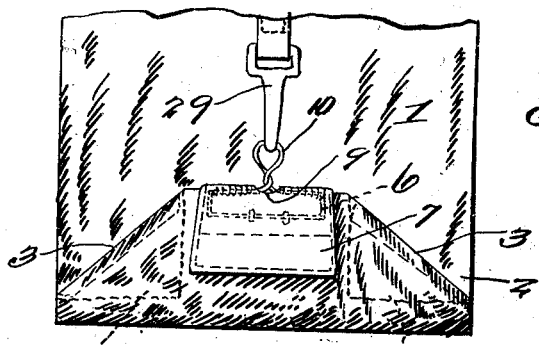

T. J. JACKSON.
FRUIT BAG.
APPLICATION FILED DEC. 29, 1909.
986,573.
Patented Mar. 14, 1911.
2 SHEETS—SHEET 1.
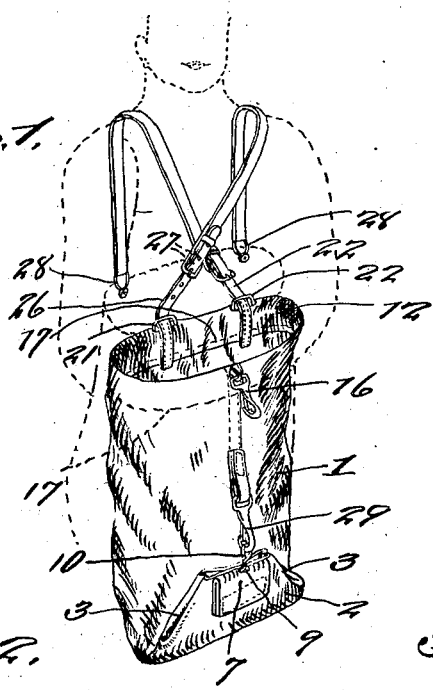
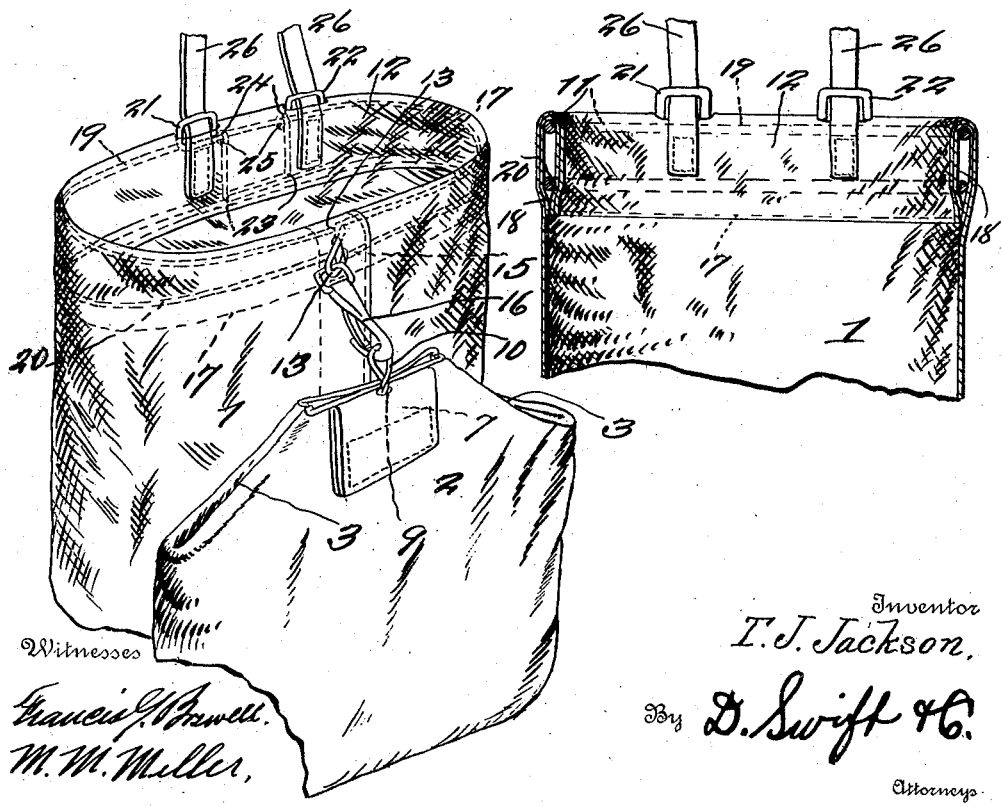
Witnesses
Francis G. Boxwell
M. M. Miller
Inventor
T. J. Jackson,
By D. Swift &Co.
Attorneys

T. J. JACKSON.
FRUIT BAG.
APPLICATION FILED DEC. 29, 1909.

986,573.

Patented Mar. 14, 1911.

2 SHEETS—SHEET 2.

Witnesses
Francis G. Boswell
M. M. Miller

Inventor
T. J. Jackson,
By D. Swift & Co.
Attorneys

UNITED STATES PATENT OFFICE.

THOMAS J. JACKSON, OF GRAND JUNCTION, COLORADO.

FRUIT-BAG.

986,573.  Specification of Letters Patent.  Patented Mar. 14, 1911.

Application filed December 29, 1909. Serial No. 535,441.

*To all whom it may concern:*

Be it known that I, THOMAS J. JACKSON, a citizen of the United States, residing at Grand Junction, in the county of Mesa and State of Colorado, have invented a new and useful Fruit-Bag; and I do hereby declare the following to be a full, clear, and exact description of the invention, such as will enable others skilled in the art to which it appertains to make and use the same.

This invention pertains to a new and useful fruit or vegetable gathering bag or receptacle, and the main object of the invention is the provision of a bag of this design having means to secure it to a person, in a position as shown in the drawings, whereby as the vegetables or fruit are picked, they may be placed within the bag, and after the same is full the bottom of the bag may be easily and readily opened, so that the contents thereof may be emptied into a bushel basket or wagon or other receptacle.

A further object of the invention is to provide such bag having open ends, and the lower portion of the bag being so folded upon itself as to close the bag to prevent the contents from falling through.

A further object of the invention is to slightly converge the lower side portions of the bag, so that as the contents thereof is emptied, it will be guided into a basket.

Another object of the invention is to provide the converged side portion with inverted folded portions, the purpose of which being to assist in preventing the contents of the bag from gradually working through the bag when the lower portion thereof is folded upon itself.

A further object of the invention is to provide a reinforcing means having an eye to engage one or more hook devices of the bag to hold the lower portion thereof properly folded.

A further object of the invention is to provide double reinforcing or bracing means for the upper opening of the bag, consisting of a single length of wire so formed and applied to the fabric of the bag (which is folded over said length of wire) as to hold the opening extended so as to readily receive the vegetables or fruit as they are dropped thereinto.

A further object of the invention is to provide adjustable strips having hooks, whereby the bag may be attached to the person using the same.

Further objects and combination of parts will be hereinafter more clearly set forth and pointed out in the appended claim.

Figure 5:
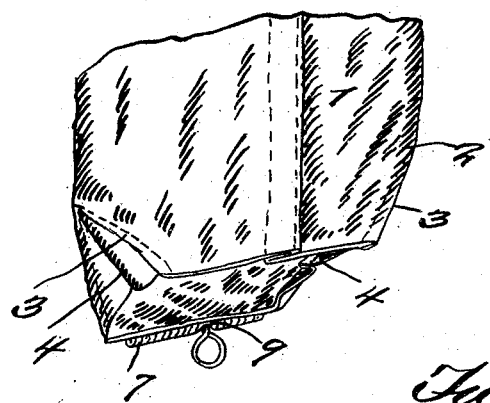
Figures 6, 7:
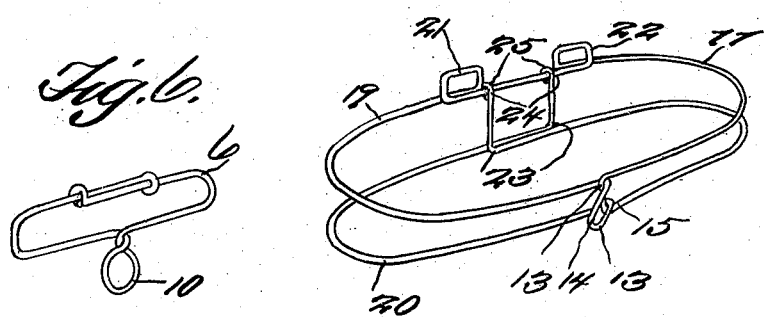

Figure 1 is a perspective view of the bag, showing the same as applied to a person, and the lower portion thereof folded in one position. Fig. 2 is a perspective view of the bag, showing the lower portion thereof folded in another position, and the reinforcing and bracing means for the upper and lower portions of the bag shown in dotted lines. Fig. 3 is a sectional view upon line 3—3 of the Fig. 2, showing the fabric of the bag folded about the reinforcing and bracing means of the upper portion thereof. Fig. 4 is a plan view of the lower portion of the bag, showing the converging sides thereof. Fig. 5 is a perspective view of the lower portion of the bag, showing the same opened, clearly disclosing the inverted folded portions thereof. Fig. 6 is a detailed perspective view of the reinforcing and bracing means of the lower portion of the bag. Fig. 7 is a detailed perspective view of the upper reinforcing and bracing means.

In regard to the annexed illustrations, 1 designates a fruit or vegetable gathering bag, formed of any suitable fabric, for instance: canvas or the like. The lower portion 2 of the bag is provided with converged sides 3, and inverted folded portions 4 (which assist in preventing the contents of the bag from working through the sides of the lower opening of the bag.)

6 denotes a metallic reinforcing or bracing member designed to extend partially about the lower opening of the bag, and about which a reinforcing strip of fabric 7 (which is attached to the side of the bag, as shown at 8) is folded. Said reinforcing strip 7 is provided with an opening 9 through which the loop or eyes of the metallic reinforcing or bracing means extends.

11 denotes a reinforcing or bracing means for the upper portion of the bag, and which extends entirely about the upper opening 12 thereof, in order to hold it properly extended, in order that the fruit or vegetables may be readily received therein. This reinforcing or bracing means 11 consists of a single length of wire, folded twice upon itself as at 13, in order to form two loops 14 and 15. The loop 14 extends through the loop 15, and connected to the loop 14 is a hook device 16. By folding this length of wire twice upon itself in the manner shown, two thicknesses of wire are extended about the upper opening of the bag, thereby forming a double reinforcing or bracing means. The fabric forming the bag is folded over these two thicknesses of wire, and is stitched as shown at 17, there being an additional strip of fabric 18 first placed about these two thicknesses of wire, in order to prevent direct wear upon the fabric forming the bag. These two thicknesses of wire are designated by the numerals 19 and 20. The upper thickness of wire 19 is formed into two loops 21 and 22, while the lower portion 20 has its end portions bent at right angles as at 23, the extremities 24 of which are turned into eye 25, which receive the upper thickness of wire 19. Connected to the loops 21 and 22 are strips 26, having suitable means 27, whereby the strips may be made longer or shorter, in order to accommodate persons of various heights. The extremities of the strips 26 are provided with hook devices 28, which may be used for connecting the bag to the wearing apparel of a person after the strips are placed over the shoulders of the person.

The side of the bag is provided with a hook device 29, with which and the hook device 16, the loops of the reinforcing and bracing means of the lower portion of the bag coöperate, in order to hold the bag properly folded, as shown clearly in Figs. 1 and 2.

When the bag is in use the lower portion thereof is folded upon itself, in the manner shown, and the strips are placed over the shoulders of the person, and properly connected in order to prevent displacement of the bag, after which the fruit or vegetables as they are picked, may be easily and readily placed within the bag. After the bag is properly filled, the loop of the lower reinforcing or bracing means may be disconnected from its hook device, thereby allowing the contents of the bag to readily empty.

Having thus set forth the invention, what is claimed as new and useful is:—

A fabric fruit gathering bag having upper and lower openings, a double metallic reinforcing bracing member for the upper opening, consisting of a single length of wire bent twice upon itself to form the loops 14 and 15, said loop 14 being bent to engage the loop 15 at the front upper portion of the bag, said loop 14 being extended through the fabric and provided with a hook device, said length of wire being bent to form the loops 21 and 22 at the rear portion of the bag, said loops 21 and 22 being extended through the fabric, said length of wire being bent to form bracing means between the double parts of the reinforcing member, said double parts being arranged at angles to one another where they surround the upper opening, said lower opening having a reinforcing member provided with an eye to engage the hook device, and means secured to the fabric at the rear of the upper opening and passed through the eyes 21 and 22 for supporting a bag upon a person.

In testimony whereof I have signed my name to this specification in the presence of two subscribing witnesses.

THOMAS J. JACKSON.

Witnesses:
  I. B. PRICKETT,
  W. TOOTHAKER.

---

Copies of this patent may be obtained for five cents each, by addressing the "Commissioner of Patents, Washington, D. C."